Feb. 11, 1941.   R. M. SOMERS   2,231,096
PHONOGRAPH RECORD RESURFACING MACHINE
Filed Aug. 16, 1939   4 Sheets-Sheet 2

Inventor
Richard M. Somers
By Henry Lanahan
Attorney

Feb. 11, 1941.    R. M. SOMERS    2,231,096
PHONOGRAPH RECORD RESURFACING MACHINE
Filed Aug. 16, 1939    4 Sheets-Sheet 4

Fig. 9

Inventor
Richard M. Somers
By Henry Lanahan
Attorney

Patented Feb. 11, 1941

2,231,096

UNITED STATES PATENT OFFICE 2,231,096

PHONOGRAPH RECORD RESURFACING MACHINE

Richard M. Somers, West Orange, N. J., assignor to Thomas A. Edison, Incorporated, West Orange, N. J., a corporation of New Jersey Application August 16, 1939, Serial No. 290,370

22 Claims. (Cl. 82—1.1)

This invention relates to machines for resurfacing phonograph records, and more particularly to means for improving the operation and control of such machines. In some respects the invention has certain features in common with those disclosed in my pending patent applications Serial Nos. 215,948 and 232,766, respectively filed on June 25, 1938, and October 1, 1938, and each entitled "Phonograph record shaving machines" (which applications have issued into Patents Nos. 2,184,365 and 2,209,893, respectively. While the invention is shown and described in connection with machines for resurfacing records such as are used in commercial phonographs, or in dictating machines, no unnecessary limitation of my invention to this type of record resurfacing machine is intended.

Phonograph record resurfacing machines of the type just mentioned usually comprise a record-supporting mandrel, an openable and closeable endgate for the mandrel, a carriage tiltable upwardly from and movable along the mandrel, means for driving the carriage forwardly along the mandrel as from a start to a terminal position, and a resurfacing tool on the carriage settable into operative position relative to the record. The carriage is driven forwardly during the operation of the machine and is freely movable manually along the record when it is in an upwardly tilted position, the upward tilting of the carriage causing the carriage to be disengaged from its driving means and also causing the resurfacing tool to be raised in a position fully free of the record.

The preparation of the machine for a record resurfacing operation involves mounting the record on the mandrel, closing the endgate, setting the tool into operative position (generally when the carriage is in a position intermediate of its path), and manually returning the carriage to start position. A record resurfacing will then be effected upon next putting the machine into operation to cause mandrel rotation and a concurrent driving of the carriage along the mandrel. At the completion of the record resurfacing the machine is stopped, the endgate opened, and the record removed from the mandrel by means of a suitable record ejector.

It is an object of my invention to partially prepare the machine for a subsequent record resurfacing as an incident to the removal of a record from the machine.

It is another object of my invention to automatically further the preparation of the machine for a record resurfacing as an incident to the mounting on the machine of the record to be resurfaced.

A feature of my invention is to effect both an upward tilting and a partial return of the carriage and also a latching of the carriage in its upwardly tilted position as an incident to the ejection of a record from the machine.

A further feature of my invention is to cause the tool to be released from its previously set position and the carriage to be thereafter unlatched from its upwardly tilted position as an incident to the operation of mounting a record on the machine.

It is another object of my invention to provide stroboscopic means by which the operator is enabled to observe the surface of the record during a record resurfacing operation.

It is a further object of my invention to provide signalling means mutually controlled by a plurality of the operating parts of the machine for indicating when the machine is in and out of condition for operation.

Other and allied objects and features of my invention will more fully appear from the following description and the appended claims.

In the description of my invention reference is had to the accompanying drawings, of which.

Figure 1:
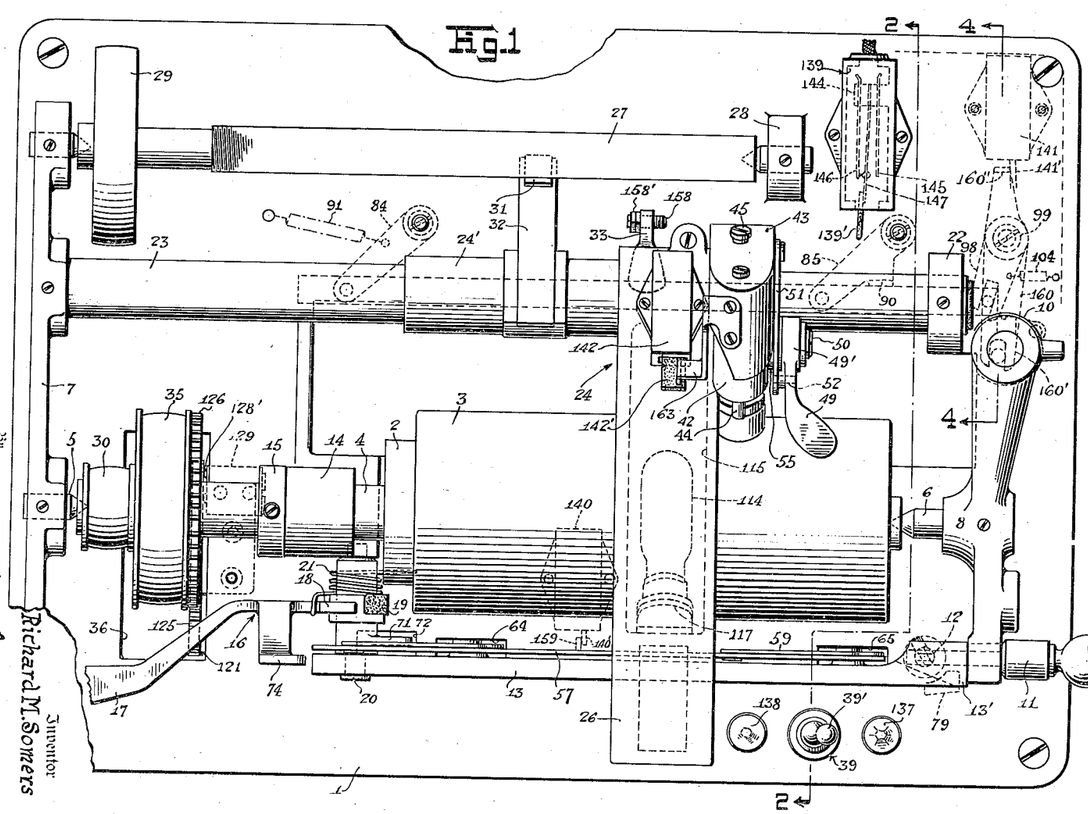
Figure 1 is a top plan view of a phonograph record resurfacing machine incorporating my invention.
Figure 2:
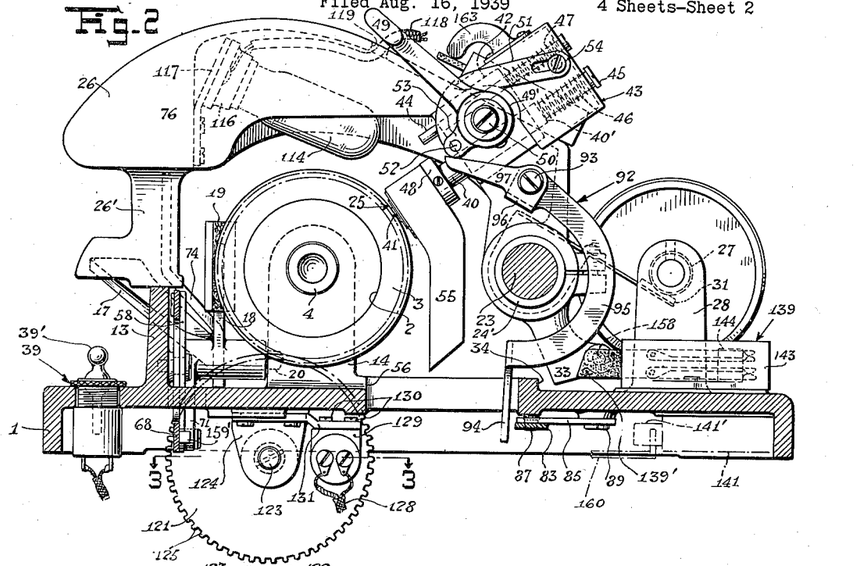
Figure 2 is a vertical section view taken substantially along the line 2—2 of Figure 1.

Reference being had to Figures 1 and 2, there will be seen a phonograph record shaving machine having a base plate 1 which supports for rotation a mandrel 2 adapted to carry a cylindrical record 3 to be resurfaced. The mandrel 2 is provided with a shaft 4 which is supported at its left and right ends by a pair of thrust bearings 5 and 6 respectively carried, by the base plate, through a standard 7 and an endgate 8. This endgate is provided with a shaft 9 which is journalled in a boss 10 extending up from the base plate (see Figure 4). The endgate is releasably held in a closed position by an endgate bolt or latch 11 provided with a shaft 12 (see Figure 6) which is journalled in the right end portion 13' of a guide rail 13, which guide rail extends along the mandrel 2 forwardly thereof. With this arrangement the bearing 6 may be moved free of the right end of the mandrel by an opening of the endgate, thereby permitting a record to be mounted on, and removed from, the mandrel. When the endgate is open the shaft 4 is intermediately supported by a standard 14, through which the shaft freely passes, and is retained in engagement with the thrust bearing 5 by the contact of a collar 15 on the shaft 4 with the left side of the standard 14.

The removal of a record from the mandrel is performed by a record ejector comprising a member 16 in the form of a bell crank, having a leftwardly extending handle 17 and an upright arm 18 carrying a shoe 19 located at the left of the record. The member 16 is pivoted on a shaft 20, carried at one end by the guide rail 13 and at the other end by the standard 14, and is biased into inoperative position, defined by the contact of the handle 17 with the base plate, by a torsional spring 21 constrained at one end by the base plate and at the other end by the handle 17. To operate the ejector the handle 17 is raised to move the shoe 19 into contact with the record so as to thereby push the record from the mandrel.

Supported by the base plate (through the standard 7 and another standard 22) is a cross rod 23 on which there is slidably and tiltably mounted a carriage 24 carrying a resurfacing tool 25. The carriage has a long sleeve 24' embracing the rod and an arm 26 extending forwardly over the mandrel and terminating in a shoe 26' which slidably rests on the guide rail 13. The tool 25 is movably mounted on the carriage for movement towards and away from the record. When the tool is set in operative position—a position in which the tool engages the record—, a rotation of the record and a concurrent feeding of the carriage along the record (as from a start to a terminal position respectively at the right and left ends of the record) will cause a surface layer of the record to be cut away, this surface layer being directed from the tool, by a chute 55, downwardly through an opening 56 in the base plate. Such feeding of the carriage is effected by a feed screw 27 rotatably supported at one end by the standard 7 and at the other end by a standard 28. This feed screw is adapted to be driven coordinately with a rotation of the mandrel shaft 4 by means of a belt coupling comprising a pulley 29 on the feed screw and a pulley 30 on the mandrel shaft. The coupling of the carriage 24 with the feed screw 27 is effected by means of a feed nut 31 carried by a resilient arm 32 extending rearwardly of the carriage sleeve 24'. When the carriage is in normal operative position—a position of the carriage when the arm 26 is resting on the guide rail 13—the feed nut 31 is urged upwardly into contact with the feed screw 27.

However, as the carriage arm is raised (which raising is limited by the contact of a post 33 on the carriage with a ridge 34 on the base plate) the feed nut 31 is moved downwardly out of engagement with the feed screw and the resurfacing tool is also raised from the record so as to render the carriage freely manually movable along the mandrel. In the use of the machine the carriage is driven or fed in a leftward direction to its terminal position and is manually returned in a rightward direction to its start position.

Figure 9:
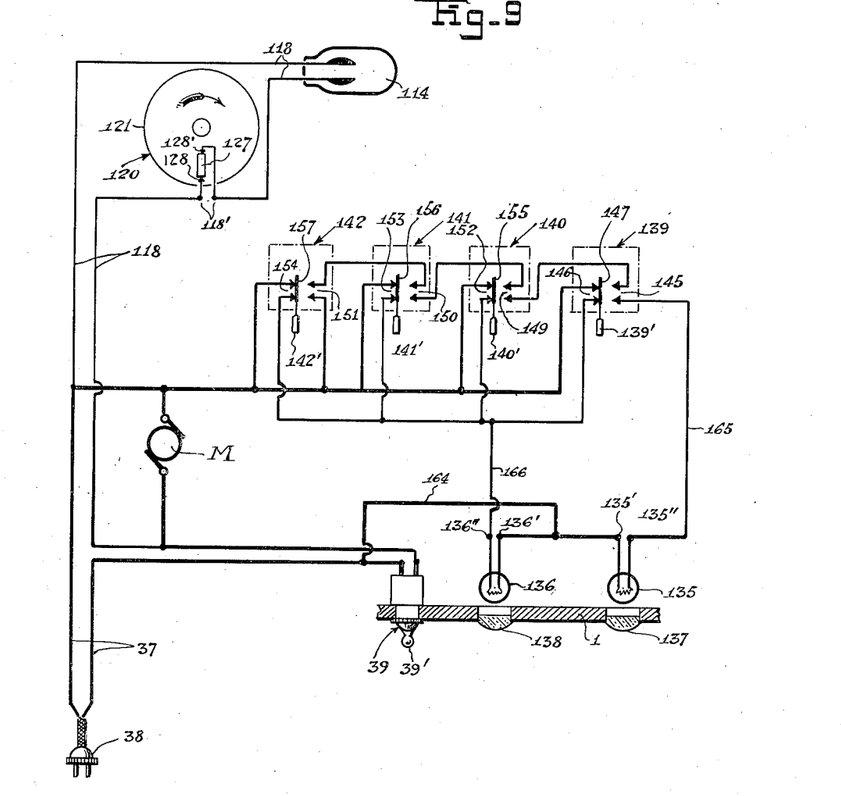
Figure 9 is a diagrammatic view of mechanism and circuits in accordance with my invention.

Rotation of the mandrel shaft 4 may be effected by a suitable electrical motor M, diagrammatically shown in Figure 9, which may be located beneath the base plate and be coupled by a belt (not shown) to a pulley 35 on the mandrel shaft, the base plate having an opening 36 through which the belt may pass. The motor M is provided with a power supply circuit 37 adapted to make connection with a suitable source of power by way of a plug 38. The motor is controlled by means of an openable and closeable switch 39, preferably of the toggle variety, which is serially connected in the circuit 37 and mounted on the base plate in the forward right-hand portion thereof as shown in Figure 1, the switch 39 having an arm 39' manipulatable to open and close the circuit 37.

The resurfacing tool 25 comprises a knife bar 40 carrying a knife blade 41 at the inner end thereof. The knife bar 40 is slidably supported by an extension 42, provided on the right side of the carriage at a point directly above the carriage rod 23, for radial movement relative to the record. The means for controlling the knife bar to set the tool into operative position and to release the tool from a set or operative position may be of a construction such as is disclosed in Brown Patent No. 2,137,383, issued November 22, 1938, and entitled "Record shaving machine." In this construction the knife bar 40 is biased away from the record, and, in the setting of the tool, is yieldably moved towards the record to bring the knife blade into engagement therewith, the knife bar being then locked in such position. To release the tool the knife bar is merely unlocked.

A means for so controlling the tool comprises a cap 43 secured to a guide rod 44 which passes slidably through the extension 42 in a direction parallel to the knife bar. The knife bar 40 extends upwardly through the cap 43 and terminates in a head 45. When the cap is moved upwardly it contacts the head 45 to move the tool away from the record into inoperative position defined by the contact of a collar 48 on the knife bar with the underside of the extension 42. The resurfacing tool is normally held in inoperative position by means of a compression spring 47 coiled about the guide rod between the cap 43 and extension 42 to urge the cap 43 upwardly. To place the tool into operative position the knife bar is yieldably moved towards the record to press the knife blade 41 into engagement therewith. This is done by pressing the cap 43 downwardly, such downward movement of the cap causing the tool to be yieldably moved therewith by means of a compression spring 46 coiled about the knife bar between a shoulder 40' on the bar and the cap 43.

The means for moving the cap downwardly to bring the tool into operative position relative to the record comprises a lever 49 which is pivoted as at 50 to the right side of the extension 42. This lever is coupled by a link 51 to the cap 43, one end of the link being pivoted by a pin 52 to a short arm 53 of the lever 49 and the other end of the link 51 having a slot and screw connection 54 with the side of the cap 43. As the lever 49 is moved in a counterclockwise direction the tool is set into operative position relative to the record, the tool being first moved towards the record into operative position by the cap 43 and being then locked in its operative position by a lock 55 such as is described in the abovementioned Brown patent. The terminal position of the lever 49, the position which the lever occupies in Figure 2, is defined by the impingement of the link 51 against the hub 49' of the lever 49. When the lever is in this terminal position the pivot pin 52 is slightly past dead center with respect to the pivot axes of the lever 49 and of the connection 54. The lever 49 is then urged towards, and is thereby releasably held in, its terminal position by reason of the upward biasing of the cap 43. When the lever 49 is, however, tripped—i. e., moved slightly out of its terminal position to return the pin 52 across the dead-center line abovementioned—the upward biasing of the cap 43 will cause the tool to be first unlocked, by the clockwise turning of the lever 49, and to be thereafter returned to inoperative position.

The above-described structure and mechanism are common to record shaving machines heretofore manufactured and used, and form a part of the present invention only insofar as they are related to or combined with other mechanism hereinafter described.

At the completion of a record resurfacing operation the carriage occupies its terminal position and the resurfacing tool its set position. To next prepare the machine for another record resurfacing operation the resurfacing tool is reset and the carriage is returned to its start position. This resetting of the tool is done when the carriage is in an intermediate position wherein the tool overlies the record, and involves releasing the tool from its previously set position, partially returning the carriage from its terminal position, and then setting the tool. When the tool has been set the carriage may be fully returned to start position. In accordance with my invention the preparation of the machine for a record resurfacing operation is partially effected as an incident to a change of record on the machine, the carriage being partially returned by the ejection of a record from the mandrel 2 and the resurfacing tool 25 being released from its previously set position by the closing of the endgate 8. However, in order that the set tool may not interfere with a change of record on the machine while the carriage is in a partially returned position, the carriage is tilted upwardly before it is partially returned and is latched in such upwardly tilted position until the tool is released.

Figures 6, 7, 8:
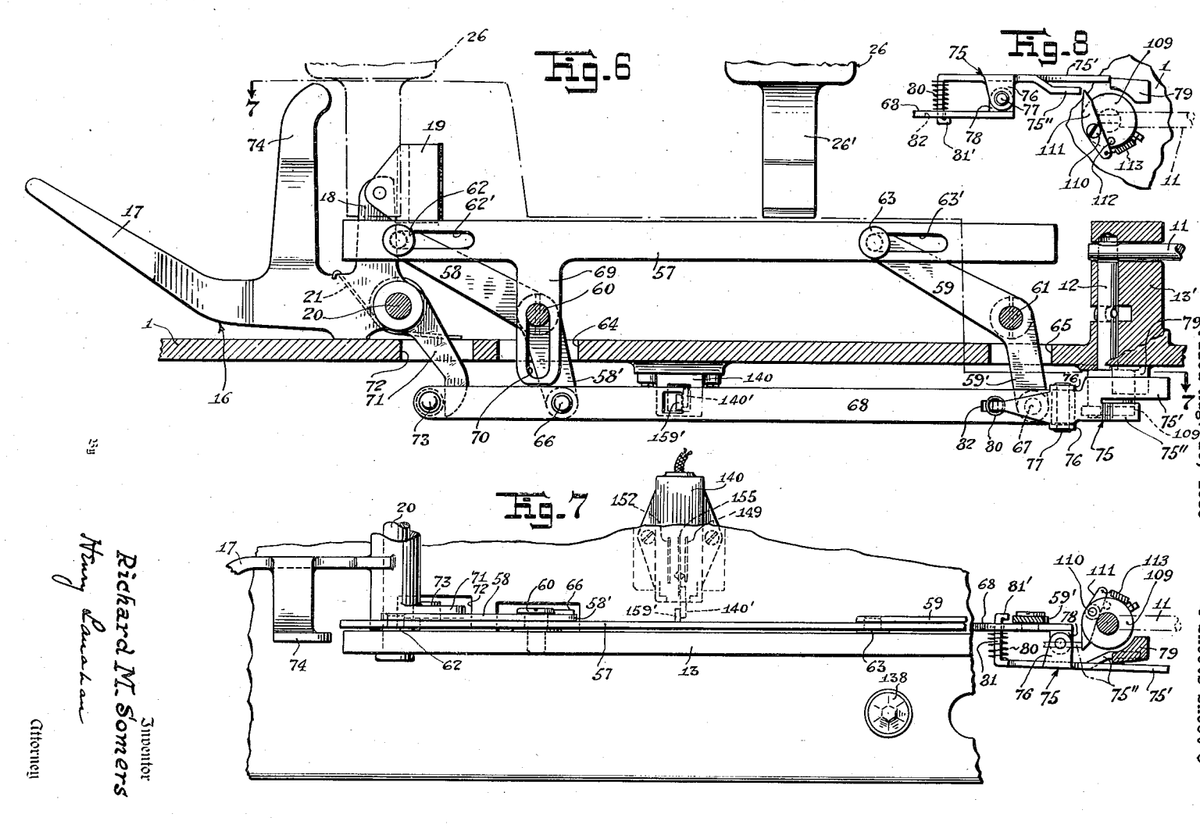
Figure 6 is a front view, partly in section, showing in elevation mechanism controlled by the record ejector for operating the tool-carriage.
Figure 7 is a fragmentary view of the mechanism of Figure 6 taken substantially along the line 7—7 of that figure.
Figure 8 is a bottom view of a portion of the mechanism of Figure 7.

The means for tilting and partially returning the carriage, is operated by the record ejector and is shown in Figures 1, 6 and 7. This means comprises a bar 57 which is extended along the guide rail 13 at a level just below the upper edge thereof and which is supported by a pair of left and right angular levers 58 and 59 pivoted by the respective screws 60 and 61 to the rearward wall of the guide rail. The levers 58 and 59 are each connected by a screw and slot connection to the bar 57, the levers respectively carrying headed screws 62 and 63 which respectively pass through slots 62' and 63' provided in the bar 57 longitudinally thereof. The lower end portions 58' and 59' of the levers 58 and 59 are extended downwardly through respective openings 64 and 65 in the base plate and are pivotally connected by respective pins 66 and 67 to a bar 68 extending laterally of the machine below the base plate. By reason of the levers 58 and 59 being interconnected by the bar 68, the levers are caused to move in fixed angular relation to each other. Thus when the levers 58 and 59 are turned in a clockwise direction from their unoperated positions—the positions they occupy in Figure 6—the bar 57 is moved upwardly above the guide rail in parallel relation to the upper edge thereof. This upward movement of the bar causes the carriage to be tilted upwardly by reason of the contact of the bar with the carriage shoe 26'. In order that the bar will be restricted to straight up and down movement, it is provided with a downwardly extending arm 69 having a vertical slot 70 which embraces the screw 60 on which the lever 58 is pivoted.

The bar 57 is normally held by its own weight in its downward or unoperated position, defined by the contact of the screw 60 with the upper end of the slot 70, and the bar 68 is thereby normally retained in its most rightward position. In order that an operation of the record ejector will cause the bar 57 to be raised to tilt the carriage the record ejector is provided with a finger 71 which extends downwardly through an opening 72 in the base plate to terminate at a point directly to the right of a cross pin 73 carried by the bar 68. When the record ejector is operated— i. e., turned in a clockwise direction—the finger 71 impinges against the pin 73 to move the bar 68 leftwardly, thereby causing a raising of the bar 57. In the normal use of the machine the carriage will be in its terminal position, shown in dash-dot lines in Figure 6, when the record ejector is operated. In order that the carriage will be partially returned by the operation of the record ejector there is provided on the handle 17 an upstanding arm 74. As the ejector is operated the arm 74 impinges against the left side of the carriage shoe 26' to return the carriage, the arm 74 being, however, so positioned relative to the carriage that it will not contact the shoe 26' until the carriage has been tilted sufficiently to disengage the feed nut 31 from the feed screw 27.

In order that the carriage will be retained in its upwardly tilted position when it has been partially returned by the record ejector there is provided means to latch the bar 68 in its leftward or operated position. This latching means is shown in Figures 6, 7 and 8 and comprises a pawl 75 having a pair of turned-over ears 76 pivoted by a pin 77 on a pair of ears 78 turned over from the bar 68. The right end portion of the pawl 75 terminates in a pair of upper and lower fingers 75' and 75" of which the finger 75' is involved in the latching of the carriage and the finger 75" in its unlatching, as is later described. The finger 75' is biased into contact with a stop member 79 projecting down from the base plate, the biasing being effected by a compression spring 80 coiled about an arm 81 bent over from the pawl and projecting through an opening 82 in the bar 68. When the bar 68 is moved into its leftward position the finger 75', however, slides off from the stop member 79 and is snapped inwardly by the spring 80 to latch the bar, the inward movement of the pawl being limited by the contact of a lug 81' on the arm 81 with the bar 68. Thus when the record ejector is operated the carriage is not only tilted upwardly and partially returned but also latched in its upwardly tilted position.

The operation of mounting a record on the machine involves placing a record on the mandrel 2, closing the endgate and then latching the endgate in its closed position. In accordance with my invention the resurfacing tool is released from set position and the carriage is thereafter unlatched from its upwardly tilted position as an incident to the mounting of a record on the machine. These operations may be conveniently effected by causing the tool to be released by the closing of the endgate and the carriage to be unlatched by the latching of the endgate in closed position.

The means for releasing the tool by the closing of the endgate is shown in Figures 1, 2, 3 and 4 and comprises a laterally extending bar 83 supported below the base plate just within the rearward edge of the opening 56 by means of a pair of left and right links 84 and 85 each pivotally connected to the bar 83 by the respective pins 86 and 87 and to the base plate by the respective screws 88 and 89. The bar 83 is thus permitted to move, with a swinging motion, forwardly and rearwardly in parallel relation to the mandrel 2. The rearward movement of the bar is limited by the contact of a stop lug 90 on the link 85 with the rearward edge of the bar 83; normally, the bar is held in contact with the stop lug 90 by means of a tension spring 91 connected to the link 84. Operatively connecting the bar 83 with the resurfacing tool is a lever 92 pivoted to the right side of the carriage on a relatively long shoulder screw 93. This lever has a lower vertical portion 94 which slidably contacts the front edge of the bar 83, a central semi-circular portion 95 curved about the carriage rod 23 rearwardly thereof and pivoted at its upper end on the shoulder screw 93 adjacently of the right side of the carriage, a bail portion 96 extending along the screw 93, and a forwardly extending arm portion 97 pivoted on the outer end of the screw 93 and terminating at a point directly below the short arm 53 of the tool-controlling lever 49, as is shown in Figure 2. Thus as the bar 83 is moved forwardly the lever 92 is turned in a clockwise direction to cause its arm portion 97 to be moved upwardly. As the arm portion 97 is so moved it impinges upon the underside of the short arm 53 to move the tool-controlling lever 49 in a clockwise direction, thereby tripping the lever to cause the release of the resurfacing tool.

A forward movement of the bar 83, such as is required to effect the release of the resurfacing tool, is caused by the closing of the endgate. The means coupling the bar 83 with the endgate comprises a short lever 98 pivoted by a screw 99 to a boss 100 extending down from the base plate. The lever 98 extends forwardly from its axis and terminates in a pair of left and right fingers 101 and 102. The rightward finger 102 is slightly longer than the finger 101 and is also offset upwardly, as at 102', so as to be disposed at a level slightly above the finger 101. Provided on the bar 83 to the right of the finger 101 is a short vertical pin 103 which terminates at a point slightly below the level of the finger 102. The finger 101 is normally held in contact with the pin 103 by means of a tension spring 104 which urges the lever 98 rightwardly. While the spring 104 thus urges the bar 83 rightwardly this spring is not made sufficiently strong to overcome the bias on the bar as provided by the spring 91.

When the endgate is opened a short vertical pin 105, carried by a collar 106 on the shaft 9 of the endgate at the level of the finger 102, impinges against the finger 102 and moves the finger 102 before it out of its path against the biasing of the spring 104, the lever 98 snapping back until the finger 101 impinges against the pin 103 when the pin 105 has cleared the finger 102. When the endgate is next closed the pin 105 impinges against the finger 102 to move the lever 98 rightwardly in a counter-clockwise direction. This movement of the lever 98 causes, by the contact of the finger 101 with the pin 103, the bar 83 to be moved rightwardly, thereby effecting the release of the resurfacing tool from set or operative position.

When the endgate is closed the resurfacing tool is released, as above explained, and then in the terminal movement of the endgate the pin 105 is moved free of the finger 102 to thereby permit the mechanism coupling the endgate with the resurfacing tool to be restored, by the spring 91, to unoperated position. For convenience of operation the endgate may be suitably biased into open position as by means of a torsional spring 107 coiled about the shaft 9 within a recess 108 in the base plate (see Figure 4), which spring may be hooked at one end on the base plate and at the other end on the collar 106 as shown.

The means for unlatching the carriage from its upwardly tilted position by the latching of the endgate in closed position is shown in Figures 6, 7 and 8, and comprises a disk 109 which is secured to the lower end portion of the shaft 12 for the endgate latch 11. Pivoted by a screw 110 to the lower face of the disk 109 is a pawl 111 which is biased in a clockwise direction, as it appears in Figure 7, against a stop pin 112 on the disk by means of a tension spring 113 connected between the pawl and the disk. When the endgate latch 11 is in operative position the pawl 111 is in the position it occupies in Figures 7 and 8. When the carriage is latched in its upwardly tilted position by the operation of the record ejector the finger 75" of the pawl 75 is moved into the position shown in dash-dot lines in Figure 7, which position of the finger is directly to the left of the position occupied by the tip of the pawl 111 when the endgate latch is in operative position. A movement of the endgate latch 11 to inoperative position will then cause the pawl 111 to snap over the finger 75", but normally this snapping of the pawl 111 over the finger 75" will not occur since the endgate will be usually unlatched before the record ejector is operated. However, when the endgate latch 11 is returned to operative position the pawl 111 will impinge against the finger 75" to release the finger 75' of the pawl 75 from the stopping member 79, thereby causing the carriage to be unlatched from its upwardly tilted position.

With the above described mechanism it is seen that the carriage is partially returned and the resurfacing tool is released from set position as an incident to a change of record on the machine. Thus at the completion of the mounting of a record on the machine the operator need only to manipulate the lever 49 to set the resurfacing tool and then to return the carriage to start position in order to place the machine in condition for a record resurfacing operation.

It is an additional feature of my invention to provide a stroboscopic lamp which is directed upon the surface of the record to be resurfaced and which is flashed at a frequency controlled in predetermined relation to the rate of record rotation so as to produce the visual effect of a slowly rotating record. By this means the record surface may be observed during a record resurfacing operation to enable the operator to predetermine during the record resurfacing operation whether or not it will be necessary to take a second cut from the record to obtain the desired degree of record smoothness. This stroboscopic lamp, given the reference character 114, may be mounted within a recess 115 provided in the underside of the carriage arm 26 as is shown in Figures 1 and 2, the mounting for the light comprising a socket 116 supported by a bracket 117 secured to the carriage arm. The circuit for the lamp comprises a two-wire cable 118 leading from the light through an opening 119 in the carriage (see Figure 2) to make connection across the motor M as shown in Figure 9, the lamp 114 thus deriving its power by way of the power supply circuit 37 for the motor and through the motor control switch 39 heretofore described.

Figures 3, 4, 5:
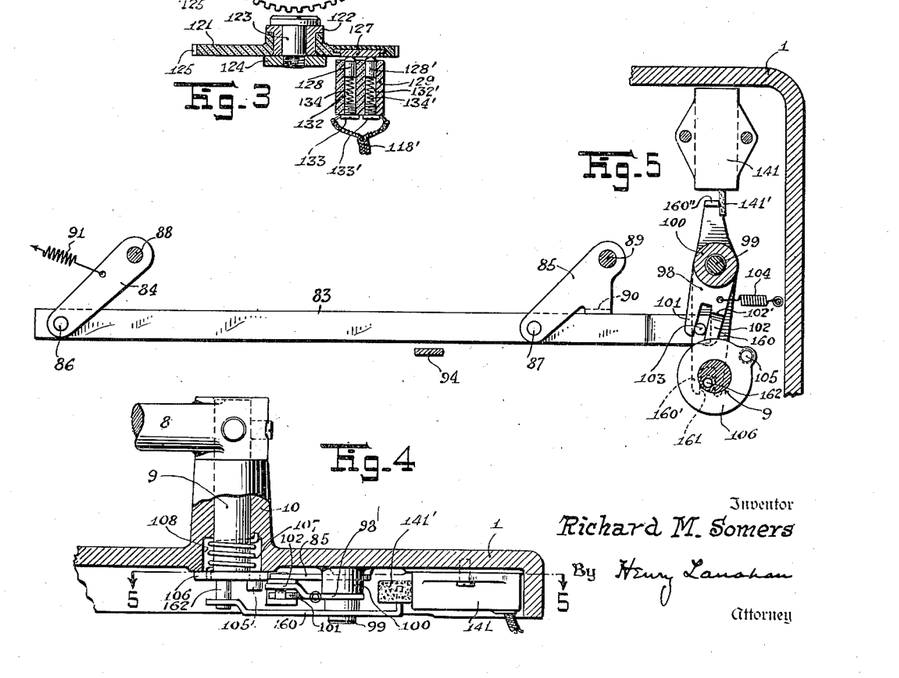
Figure 3 is a horizontal sectional view taken substantially along the line 3—3 of Figure 2.
Figure 4 is a fragmentary view, partly in section on line 4—4 of Figure 1 and showing, in elevation, details of an interlinkage system controlled by the endgate.
Figure 5 is a fragmentary view, partly in section along the line 5—5 of Figure 4 and showing the interlinkage system, abovementioned, in plan view.

Serially included in a lead 118' of the cable 118 is a circuit interrupter 120 diagrammatically shown in Figure 9. The mechanism of the interrupter is shown in Figures 2 and 3, and comprises a disk 121 made of insulating material, such as Bakelite, and having a metal hub 122 pivoted by a shoulder screw 123 to a bracket 124 secured to the underside of the base plate at a point below the mandrel. The disk 121 is provided with gear teeth 125 on its periphery which mesh with a drive gear 126 provided on the right side of the pulley 35. Embedded in the right face of the disk 121 is a radially extending bar 127 of suitable conducting material, and slidably contacting this face of the disk is a pair of electrical brushes 128 and 128'. These brushes are supported by a frame 129 made of insulating material and held by screws 130 to a bracket 131 which in turn is secured to the underside of the base plate. The frame 129 is provided with a pair of openings 132 and 132' in which the brushes 128 and 128' are respectively disposed. The openings 132 and 132' are respectively provided with screw plugs 133 and 133' and interposed between the brushes 128 and 128' and the respective plugs 133 and 133' are compression springs 134 and 134'. These springs bias the brushes into contact with the right face of the disk 121 and also provided an electrical connection from the brushes 128 and 128' to the respective plugs 133 and 133'. The plugs 133 and 133' are serially connected in the lead wire 118' of the cable 118 as shown in Figure 9.

In the mechanism just described it is seen that an electrical connection is momentarily made between the brushes 128 and 128', by way of the bar 127, during each revolution of the disk 121, the making of this connection serving to connect the lamp 114 with the power supply circuit 37. When the motor M is in operation the disk 121 is rotated by the motor to cause a flashing of the lamp 114. In order that this flashing may produce the effect of a slowly rotating record the effective diameter of the disk 121 is made slightly larger, say 1 per cent, than the effective diameter of the gear 126. Thus the disk 121 will be rotated at a rate 1% slower than that of the record rotation and the lamp 114 will be flashed at a rate 1% slower than the rate of record rotation, thereby giving the visual effect of a rate of rotation of the record which is 1% of its actual rate. For a rate of record rotation of 1800 R. P. M.—which is the usual rate during a record resurfacing—the apparent rate of record rotation will then be 18 R. P. M. This relatively slow apparent rotation of the record enables the operator to clearly observe the record surface to predetermine, during a record resurfacing, if there is a need for taking additional cuts from the record.

An additional feature of my invention is to provide a signalling means for indicating when the machine is in and out of condition for operation. When the machine is in condition for operation the carriage rests on the guide rail 13 at its start position, the endgate is closed and the resurfacing tool is set into operative position relative to the record. Thus the signalling means may be appropriately controlled by the carriage, both in respect of its tilting and of its movement along the record, by the endgate and by the resurfacing tool. While, in the illustration of my invention, the signalling means is shown as being jointly controlled by the parts of the machine abovementioned, it will be understood that the control of the signalling means need not necessarily involve all of these parts of the machine or be limited to these parts, since my invention contemplates a signalling means mutually controlled by a plurality of the manipulatable parts of the machine in a way such that each of these manipulatable parts must be in their respective operative positions before the signalling means will indicate that the machine is in condition for operation, and such that the placing of any one of these manipulatable parts into its inoperative position will cause the signalling means to indicate that the machine is out of condition for operation.

The signalling means may comprise a pair of lamps 135 and 136 respectively mounted beneath green and red colored windows 137 and 138 provided in the base plate as shown in Figure 1. The lamps 135 and 136 may receive their power by way of the power supply circuit 37 and be controlled so that the lamp 135 is operated to provide a green light—a "go" indication—when the machine is in condition for operation and so that the lamp 136 is operated to provide a red light—a "stop" indication—when the machine is out of condition for operation. The control means for these lamps comprises switches 139, 140, 141 and 142 shown diagrammatically in Figure 9. These switches are each similar to the other, being of a biased, single-pole double-throw shorting type, and are separately controlled by manipulatable parts of the machine, as is hereinafter described.

The switch 139 is mounted on top of the base plate in the rearward right-hand portion thereof and is shown in detail in Figures 1 and 2. This switch has a frame 143 comprising a stack 144 insulatedly supporting, in cantilever fashion, right and left pairs 145 and 146 of upper and lower contact springs, and an intermediate shorting or pole member 147. The pole member 147 is biased leftwardly into contact with the pair of contact springs 146 to connect these contact springs together, and is movable against its biasing to thereby open the pair of contact springs 146 and to close the pair of contact springs 145. The pole member 147 is controlled by way of an operating arm 139' of suitable insulating material which is mounted on the pole member and extended outwardly of the frame 143.

The switches 140, 141 and 142, being similar to the switch 139, are sufficiently illustrated by a diagrammatic showing thereof. These switches, as they appear in Figure 9, are respectively provided with rightward pairs of contacts 149, 150 and 151; with leftward pairs of contacts 152, 153 and 154; and with shorting or pole members 155, 156, and 157. The pole members 155, 156, and 157 are biased leftwardly into contact with the leftward pairs of contacts 152, 153, and 154, respectively, and are movable against their biasing to connect together the rightward pairs of contacts 149, 150, and 151, respectively. Provided on the pole members 155, 156 and 157, respectively, are operating arms 140', 141' and 142', such as the operating arm 139' of the switch 139, as shown in Figure 1.

The switch 139 is controlled by the movement of the carriage 24 into and out of start position. When the carriage is moved into start position a stud 158, threaded into the post 33 of the carriage and locked in place by the lock nuts 158', impinges against the operating arm 139' of the switch 139 to move the pole member 147 rightwardly, thereby closing the pair of contacts 145 to each other. When the carriage is moved out of start position the reverse action takes place: the pair of contacts 145 being opened and the pair of contacts 146 being closed by reason of the biasing of the pole member 147.

The switch 140 is mounted on the underside of the base plate and controlled with respect to the tilting of the carriage. When the carriage is resting on the guide rail the bar 68 is in its most rightward position and the pole member 155 is held out of its biased position by the contact of a lug 159' on the bar with the arm 140', the pair of contacts 149 of the switch being then maintained closed as may be seen by reference to Figure 7. However, when the carriage is tilted upwardly by the record ejector the bar 68 is moved leftwardly and the lug 159' is moved free from the switch arm 140' to permit the pole member 155 of the switch 140 to be moved, by reason of its biasing, into position to close the pair of contacts 152. Thus when the carriage is tilted upwardly by the ejector, or latched in its upwardly tilted position as heretofore explained, the pair of contacts 152 are closed, but when the carriage is free to rest on the guide rail the pair of contacts 149 are closed.

The switch 141 is mounted on the underside of the base plate in the rearward right-hand portion thereof and is controlled by the opening and closing of the endgate 8. The means connecting the endgate 8 with the switch 141 comprises a lever 160 pivoted on the screw 99. The forward end 160' of the lever 160 terminates in an open slot 161 which is engaged by a vertical pin 162 carried by the collar 106. When the endgate is closed the switch arm 141' is held out of biased position by its contact with the rearward end portion 160'' of the lever 160, the pair of contacts 150 of the switch being then closed. However, when the endgate is opened the lever 160 is moved free from the switch arm 141' to permit the pole member 156 of the switch 141 to be moved, by reason of its biasing, into position to close the pair of contacts 153. Thus the pairs of contacts 153 and 150 are respectively closed by the opening and closing of the endgates.

The switch 142 is mounted on the carriage and is controlled by the resurfacing tool. When the tool is in inoperative position the switch 142 is in its biased position, the pair of contacts 154 being then closed. However, as the resurfacing tool is set into operative position a finger 163 mounted on the cap 43 impinges against the operating arm 142' of the switch to move the pole member 157 so as to close the pair of contacts 151. Thus the pairs of contacts 154 and 151 are respectively closed by the placing of the resurfacing tool into inoperative and operative positions.

The lamp 135, which provides the green light, has a terminal 135' connected by a conductor 164 directly to one side of the power supply circuit 37. The other terminal 135'' of the lamp 135 is connected to the other side of the power supply circuit 37 by way of a conductor 165 which serially includes the pairs of contacts 145, 149, 150 and 151 of the switches 139, 140, 141 and 142 respectively—which pairs of contacts are respectively closed when the respective switches are out of their biased position. Since these switches are each maintained out of their biased positions, as above explained, only when the carriage is in start position and free to rest upon the guide rail, the endgate is closed and the resurfacing tool is set in operative position, the lamp 135 is closed to its power source to produce a green light only when the machine is in condition for operation.

The lamp 136, which provides the red light, has a terminal 136' which is also connected by the conductor 164 directly to one side of the power supply circuit 37. The other side of the power supply circuit 37 is connected by way of a conductor 166 which serially includes a parallel connection of the pairs of contacts 146, 152, 153 and 154 of the switches 139, 140, 141 and 142, respectively—which pairs of contacts are respectively closed when the respective switches are in their biased positions. Thus the lamp 136 is closed to its source to provide a red light whenever any one of the switches 139, 140, 141 and 142 is in its biased position. Since one of these switches is placed in biased position when either the carriage is out of start position or latched in an upwardly tilted position, or the endgate is open, or the resurfacing tool is in inoperative position, a red light is always provided when the machine is out of condition for operation.

Although I have herein showed and described my invention in terms of a certain preferred embodiment it will be understood that this embodiment is merely illustrative of my invention and not limitative thereof as many changes and modifications may be made in this embodiment without departing from the scope of my invention, which I undertake to express according to the following claims.

I claim:

1. In a phonograph record resurfacing machine on and from which a record may be mounted and removed: the combination of a movably mounted carriage capable of forward and return movements relative to a supported record; a resurfacing tool on said carriage settable into operative position relative to a supported record and releasable therefrom; means operated incidental to record mounting and record removal; and means controlled by said last-mentioned means and operated incidental to a change of record on the machine, for causing said carriage to be partially returned and said tool to be released.

2. In a phonograph record resurfacing machine having a support on and from which a record may be mounted and removed: the combination of a movably mounted carriage capable of forward and return movements relative to said support; a resurfacing tool on said carriage settable into operative position relative to a supported record; a member operated incidental to the removal of a record from the machine; a member operated incidental to the mounting of a record on the machine; and means, jointly controlled by said members, for causing said carriage to be partially returned and said tool to be released incidental to a change of record on the machine.

3. In a phonograph record resurfacing machine having a support on and from which a record may be mounted and removed: the combination of a member moved incidental to the removal of a record from the machine; a tool-carriage movable along and tiltable upwardly from said support; a latch for holding said tool-carriage in an upwardly tilted position; and means, operatively connected with said member, for causing said carriage to be moved into said upwardly tilted position and to be subjected to the action of said latch upon the removal of a record from the machine.

4. In a phonograph record resurfacing machine having a support on and from which a record may be mounted and removed: the combination of a member moved incidental to the removal of a record from the machine; a movably mounted tool-carriage; driving means normally connected with said tool-carriage and disconnectable therefrom; a latch operable to maintain said tool-carriage disconnected from said driving means; and means, controlled by said member, for causing said tool-carriage to be disconnected from said driving means and to be subjected to the action of said latch upon the removal of a record from the machine.

5. In a phonograph record resurfacing machine having a support on and from which a record may be mounted and removed: the combination of a member moved incidental to the removal of a record from the machine; a tool-carriage capable of forward and return movements relative to said support and tiltable upwardly therefrom; a latch operable to releasably hold said tool-carriage in an upwardly tilted position; and means, controlled by said member, for partially returning and upwardly tilting said carriage and for subjecting the same to the action of said latch, as an incident to the removal of a record from the machine.

6. In a phonograph record resurfacing machine having a support on and from which a record may be mounted and removed: the combination of a member moved incidental to the removal of a record from the machine; a tool-carriage capable of forward and return movements relative to said support; driving means; means for coupling said tool-carriage with said driving means, normally maintained in operative position and latchable in inoperative position; and means, controlled by said member, for causing said carriage to be partially returned and said coupling means to be latched into inoperative position.

7. In a phonograph record resurfacing machine having a support for a record: the combination of a tool-carriage capable of forward and return movements relative to said support and tiltable upwardly therefrom; a latch for holding said tool-carriage in an upwardly tilted position; a record ejector; and means, controlled by said ejector, for partially returning and upwardly tilting said tool-carriage and subjecting the same to the action of said latch.

8. In a phonograph record resurfacing machine having a support for a record: the combination of a tool-carriage capable of forward and return movements relative to said support; driving means for said tool-carriage normally connected therewith and disconnectable therefrom; a latch operable to maintain said tool-carriage disconnected from said driving means; a record ejector; and means, operated incidental to the operation of said ejector, for causing said tool-carriage to be disconnected from said driving means and to be further partially returned and subjected to the action of said latch.

9. In a phonograph record resurfacing machine having a support on and from which a record may be mounted and removed: the combination of a carriage mounted for movement along said support and having normal and upwardly tilted angular positions; a resurfacing tool on said carriage settable into operative position relative to the record and releasable therefrom; means for upwardly tilting said carriage and thereafter latching the carriage in its tilted position as an incident to record removal; and means, operated incidental to the mounting of a record on the machine, for releasing said resurfacing tool from set position and thereafter unlatching said carriage to permit its return to normal angular position.

10. In a phonograph record resurfacing machine having a support on and from which a record may be mounted and removed: the combination of a carriage capable of forward and return movements along said support and tiltable upwardly from a normal angular position; a resurfacing tool settable into operative position relative to the record and releasable therefrom; a latch for releasably holding said carriage in an upwardly tilted position; means, rendered effective incidental to record removal, for upwardly tilting and partially returning said carriage and for causing said latch to be rendered operative; and means, operated incidental to the mounting of a record on the machine, for releasing said tool from its set position and thereafter rendering said latch inoperative whereby to permit said carriage to return to normal angular position.

11. In a phonograph record resurfacing machine having a support on and from which a record may be mounted and removed: the combination of a carriage slidably and tiltably mounted relative to said support; a resurfacing tool on said carriage settable into operative position relative to the record and releasable therefrom; a latch operable to releasably hold said carriage in an upwardly tilted position; means for causing said carriage to be tilted upwardly and said latch to be rendered operative upon the removal of a record from the machine; and means, operated as an incident to the operation of mounting a record on the machine, for releasing said tool from operative position and thereafter releasing said latch to permit the lowering of the carriage from its upwardly tilted position.

12. In a phonograph having a record-supporting mandrel: the combination of a resurfacing tool settable into operative position in relation to a record supported by said mandrel; an openable and closeable endgate for said mandrel; and means, operated by the closing of said endgate, for causing the return of the set tool to inoperative position.

13. In a phonograph record resurfacing machine having a mandrel for supporting a record and an endgate for said mandrel; the combination of a tool-carriage tiltable relative to said mandrel; a latch for releasably holding said tool-carriage in an upwardly tilted position; a latch for said endgate; and means, controlled by said endgate latch, for releasing said tool-carriage latch.

14. In a phonograph record resurfacing machine having a mandrel for supporting a record and an openable and closeable endgate for said mandrel: the combination of a tiltably mounted tool-carriage latchable in an upwardly tilted position; a latch for holding said endgate in closed position; and means, controlled as an incident to the latching of said endgate in closed position, for releasing said tool-carriage from its latched position.

15. In a phonograph record resurfacing machine having a record-supporting mandrel and an endgate for said mandrel: the combination of a tool-carriage; driving means; coupling means normally connecting said tool-carriage with said driving means and placeable into inoperative position; a latch for retaining said coupling means in inoperative position; a latch for holding said endgate in closed position; and means for controlling one of said latches by the other.

16. In a phonograph record resurfacing machine having a record-supporting mandrel and an endgate for said mandrel: the combination of a tiltably mounted tool-carriage; a latch for holding said tool-carriage in an upwardly tilted position; a latch for holding said endgate in closed position; and means for releasing one of said latches by the release of the other.

17. In a phonograph record resurfacing machine having a mandrel on and from which a record may be mounted and removed: the combination of a carriage capable of forward and return movements along said mandrel and tiltable upwardly therefrom; a resurfacing tool on said carriage settable into and releasable from and operative position relative to the record; an openable and closeable endgate for said mandrel; a latch for holding said endgate in closed position; means for partially returning said carriage and latching the same in an upwardly tilted position as an incident to the operation of removing a record from the machine; means for releasing said tool from set position by the closing of said endgate; and means for unlatching said carriage by the movement of said endgate latch to operative position.

18. In a phonograph record resurfacing machine: the combination of means for rotating a record; a stroboscopic lamp for lighting the surface of the record; and means, controlled in predetermined relation to the rate of rotation of the record, for intermittently flashing said lamp to produce the visual effect of a relatively slow rotation of the record, whereby to permit the operator to observe the effectiveness of a record resurfacing during the resurfacing operation.

19. In a phonograph record resurfacing machine: the combination of means for rotating a record to be resurfaced; a stroboscopic lamp for lighting the surface of the record; a circuit for said lamp; and interrupting means for said circuit operated by said rotating means at a predetermined and different rate from the rate of record rotation, for flashing said lamp on the record, whereby to permit the operator to observe the record surface during a record resurfacing operation.

20. In a phonograph record resurfacing machine having a record-supporting mandrel: the combination of an openable and closeable endgate for said mandrel; a carriage movable along said mandrel between start and terminal positions; a resurfacing tool on the carriage settable into and releasable from an operative position relative to the record; signalling means providing "stop" and "go" indications; and control means, for said signalling means, jointly controlled by said endgate and carriage and resurfacing tool, for causing said signalling means to effect a "go" indication only when said endgate is closed, said carriage is in start position and said resurfacing tool is set.

21. In a phonograph record resurfacing machine having a record-supporting mandrel: the combination of a mechanism operable to resurface a record supported by said mandrel comprising a plurality of manipulatable parts, each of said parts being adapted to be in respective predetermined positions to place said mechanism in condition for operation; a signalling means providing "stop" and "go" indications; and switch means, operatively associated with said several manipulatable parts respectively and mutually controlling said signalling means, to cause the signalling means to effect "go" and "stop" indications when said mechanism is respectively in and out of condition for operation.

22. In a phonograph record resurfacing machine having means for supporting a record to be resurfaced: the combination of a mechanism operable to effect a resurfacing of the record and comprising a plurality of parts each manipulated in the use of the machine, each of said parts being adapted to be in respective predetermined positions to place the machine in condition for operation; signalling means providing "stop" and "go" indications; switch means for said several manipulatable parts respectively each operated by the movement of its respective part into and out of its said predetermined position; and a circuit mutually connecting said several switch means with said signalling means to cause the signalling means to effect "go" and "stop" indications when the machine is placed into and out of condition for operation.

RICHARD M. SOMERS.

CERTIFICATE OF CORRECTION.

Patent No. 2,231,096. February 11, 1941.

RICHARD M. SOMERS.

It is hereby certified that error appears in the printed specification of the above numbered patent requiring correction as follows: Page 1, first column, line 11, for the patent number "2,209,893" read --2,209,833--; page 5, first column, line 49-50, for the word "provided" read --provide--; and that the said Letters Patent should be read with this correction therein that the same may conform to the record of the case in the Patent Office.

Signed and sealed this 8th day of April, A. D. 1941.

(Seal)

Henry Van Arsdale,
Acting Commissioner of Patents.